United States Patent
Froloff

(10) Patent No.: US 7,089,504 B1
(45) Date of Patent: Aug. 8, 2006

(54) SYSTEM AND METHOD FOR EMBEDMENT OF EMOTIVE CONTENT IN MODERN TEXT PROCESSING, PUBLISHING AND COMMUNICATION

(76) Inventor: Walt Froloff, 273 D Searidge Rd., Aptos, CA (US) 95003

( * ) Notice: Subject to any disclaimer, the term of this patent is extended or adjusted under 35 U.S.C. 154(b) by 0 days.

(21) Appl. No.: 09/563,624

(22) Filed: May 2, 2000

(51) Int. Cl.
 *G06F 15/00* (2006.01)

(52) U.S. Cl. ........................................ 715/839; 715/764
(58) Field of Classification Search ................. 345/762, 345/763, 764, 708, 781; 715/762, 763, 855, 715/854, 839, 764
See application file for complete search history.

(56) References Cited

U.S. PATENT DOCUMENTS

| | | | | |
|---|---|---|---|---|
| 5,732,232 A | * | 3/1998 | Brush, II et al. | ........... 345/764 |
| 5,734,794 A | * | 3/1998 | White | ........................ 709/210 |

* cited by examiner

*Primary Examiner*—Cao (Kevin) Nguyen
(74) *Attorney, Agent, or Firm*—Walt Froloff

(57) ABSTRACT

Aspects of the invention provide ways to include emotive content in written communication. The emotive content serves many needs not currently addressed in written word computer applications and text generation aids such as word processors, web publishers, email, file archives, faxes, cell phones, PDAs other applications. Adding emotive content to messages adds information, which can help to interpret and amplify the text message, improve the message integrity and fidelity of communication. Emotional content can contain and convey the subliminal messages, which are vital to a user's interaction with one another via modern communication technologies. Aspects of the invention provide ways for the sender or author to add emotional content, which can capture, maintain, and focuses a receiver's interest.

Current expression of emotive content and emotive intensity in written word are rarely used because of lack of writing ability, lack of facilitation or lack of capability. An aspect of the invention provides mechanisms, which facilitate user emotive embedment in the written word without regard to personal language expression and language manipulation skills, vocabulary size or writing style.

Aspects of the invention provide sets of emotive primitives, mechanisms and techniques to manipulate these primitives to represent emotive states and emotive intensities while "co-existing" with the actual textual message in the communications. These are primarily done through the use of face glyphs, colors, animation, fonts and also sets of "feeling" words.

14 Claims, 14 Drawing Sheets

Comparison of same intensity 2 emotive states applied to same text phrase

| Ecstatic | 2 | "I don't know, ※ why should I care?" |
| Disapproving | 2 | "I don't know, ʊ why should I care?" |
| Jealous | 2 | "I don't know, ⚡ why should I care?" |
| Suspicious | 2 | "I don't know, ~ why should I care?" |
| Paranoid | 2 | "I don't know, ~ why should I care?" |
| Innocent | 2 | "I don't know, ⊙⊙ why should I care?" |
| Aroused | 2 | "I don't know, ⌣ why should I care?" |

Fig. 1

Comparison of higher intensity emotive states applied to same text phrase

Ecstatic — 202  [5] — 203  ☺ "I don't know, ☺ why should I care?" — 204

Disapproving — 205  [9] — 206  "I don't know, ☹ why should I ☹ care?" — 207

Jealous — 208  [5] — 209  "I don't know, why should I care?" — 210

Suspicious — 211  [5] — 212  "I don't know, why should I care?" — 213

Paranoid — 214  [5] — 215  "I don't know, why should I care?" — 216

Innocent — 217  [5] — 218  "I don't know, why should I care?" — 219

Aroused — 220  [9] — 221  "I don't know, why should I care?" — 222

Fig. 2

Gettysburg Address

Four score and seven years ago our fathers brought forth on this continent, a new nation, conceived in Liberty, and dedicated to the proposition that all men are created equal ⎯302

Now we are engaged in a great civil war, testing whether that nation, or any nation so conceived and so dedicated, can long endure. . We are met on a great battlefield, as a final resting place for those whoa here gave their lives that that nation might live. It is altogether fitting and proper that we should do this. ⎯306

But in a larger sense, we can not dedicate – we can not consecrate – we can not hallow – this ground. The brave men, living and dead, who struggled here, have consecrated it, far above our poor power to add or detract. The world will little note, nor long remember what we say here, but it can never forget what they did here. ⎯308

It is for us the living rather to be dedicated here to the unfinished work, which they who fought here have thus far so nobly advanced. It is rather for us – that from these honored dead we take increased devotion to that cause for which they gave the last full measure of devotion – that we here highly resolve that these dead shall not have died in vain – that this nation, under God, shall have a new birth of freedom – and that government of the people, by the people and for the people, shall not perish from the earth ⎯310

FIG. 3

Gettysburg Address 402

Four score and seven 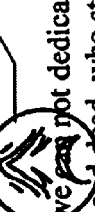 years ago our fathers brought forth on this continent, a new nation, conceived in Liberty, and dedicated to the proposition that all men are created equal 406 404

Now we are engaged in a great civil war, testing whether that nation, or any nation so conceived and so dedicated, can long endure. We are met on a great battlefield, as a final resting place for those whoa here gave their lives that that nation might live. It is altogether fitting and proper that we should do this. 408

But in a larger sense, we can not dedicate – we can not consecrate – we can not hallow – this ground. The brave men, living and dead, who struggled here, have consecrated it, far above our poor power to add or detract. The world will little note, nor long remember what we say here, but it can never forget what they did here. 410

It is for us the living rather to be dedicated here to the unfinished work, which they who fought here have thus far so nobly advanced. It is rather for us – that from these honored dead we take increased devotion to that cause for which they gave the last full measure of devotion – that we here highly resolve that these dead shall not have died in vain – that this nation, under God, shall have a new birth of freedom – and that government of the people, by the people, and for the people, shall not perish from the earth 412

Sad, painful, sad, grieving, grieving, grieving

FIG. 4

| | | | | |
|---|---|---|---|---|
| acceptance | appealing | bright | curious | disgruntled | envious | futility |
| admiring | appreciated | burned up | cynical | disgusted | esteemed | glad |
| adored | apprehensive | calm | daring | dislike | estranged | gleeful |
| affectionate | ashamed | cared-for | defeated | dismal | exasperated | gloomy |
| aggravated | assured | cautious | degraded | dismayed | excited | good |
| alarmed | astonished | cocky | dejected | dissatisfied | exhausted | grateful |
| alert | audacious | competent | delighted | distrustful | expectant | great |
| alienated | awed | concern about | dependent | disturbed | faith in | grieved |
| amazed | bashful | concern for | depressed | doubtful | fearful | grouchy |
| ambivalent | belligerent | confident | despair | dour | fed up | grumpy |
| amused | benevolent | comfortable | desperate | down | fond | guilty |
| angry | bewildered | confusion | despised | dread | forlorn | happy |
| annoyed | bitter | consoled | devastated | eager | frantic | hate |
| antagonistic | bold | contemptuous | disappointed | edgy | friendly | helpless |
| anticipating- | bored | cornered | disapproval | elated | frightened | hopeful |
| anxious | bothered | courageous | disconcerted | embarrassed | frustration | hopeless |
| apathetic | buoyant | coveting | disconsolate | enraged | fulfilled | horrified |
| appalled | brave | crushed | discouraged | ensure | furious | hostile |

FIG. 9a

| | | | | |
|---|---|---|---|---|
| humbled | jittery | moody | put down | shy | tough | useless |
| humiliated | jolly | nervous | puzzled | skeptical | tranquil | valiant |
| hurt | jumpy | nosey | refreshed | solemn | trapped | valued |
| idolized | lethargic | optimistic | regretful | sorry | trepidation | vibrant |
| impatient | listless | out of place | rejected | startled | troubled | vital |
| important | loathed | outraged | relaxed | strong | trusting | vulnerable |
| inadequate | lonely | overwhelmed | relieved | Stubborn | turned off | warmth |
| independent | longing | pained | reluctant | sullen | turned on | weak |
| indifferent | lost | panicky | repulsed | supported | uncomfortable | weary |
| indignant | love | passionate | resentful | surprised | uneasy | wonder |
| inefficient | loved | patient | resigned | suspicious | unfulfilled | worn out |
| infatuated | loyal | peaceful | restless | Sympathetic | unhappy | worried |
| inferior | lust | perplexed | risking- | teed off | untroubled | worthless |
| inhibited | mad | pessimistic | sad | tempted | unwanted | worthy |
| inquisitive | meaningless | pitiful | satisfaction | tender | upset | wrung out |
| insecure | melancholy | pleased | scared | tense | uptight | yearning |
| insulted | miserable | pressured | self-conscious | threatened | used | zealous |
| irritated | mistrustful | proud | sexy | thrilled | | |
| jealous | mixed up | provoked | Shocked | timid | | |

FIG. 9b

SYSTEM AND METHOD FOR EMBEDMENT OF EMOTIVE CONTENT IN MODERN TEXT PROCESSING, PUBLISHING AND COMMUNICATION

BACKGROUND

Field of the Invention

The field of the present invention relates in general to modern communication format and content. More particularly, the field of the invention relates to a system and method for embedding and decoding emotive content within textual communication.

Emotional content is basic to most human interaction. Emotions are a powerful driving force in communication. Emotions happen without our conscious thought and very often affect our way of thinking and acting. They are held by some to be the root cause of almost all action. In communicating with each other, we display our emotions unconsciously, without being aware of their communicative nature. Non-verbal communication is an example of our true feelings manifesting themselves with or without our conscious thought. Non-verbal communication can be louder and convey more meaning than our verbal communication. Much of our conversation is aimed at either describing our feelings or creating desired feelings in the receiver. What is missing from text communication, which is proliferating with a myriad of new computer applications, is the ability to convey emotion. What is needed is a way to clarify the emotional content of text and convey emotion in a computer application.

Artificial Intelligence and its branch "Natural Language" were an attempt two decades ago to build parsers that were English grammar based. A few products were generated that provided "English" interfaces to a variety of computer applications. The hope was that communication with computers would become simplified and easy enough for the common non-computer literate person to more easily access and use the computer. These all failed to bring the desired results. The reasons are not well understood. Interfaces have improved in the last decade to the current point and click Graphical User Interfaces (GUI) provided by MS Windows, Macintosh OS and others. We are still hard at work looking at how to interface with machines and technology.

There is a dissimilarity in the way a computer and the human mind work, which is why "friendly" interfaces have been so hard to design and so long in coming. The interfaces thus far have been designed from the computer standpoint so that data stored in various forms can be sorted and retrieved. While the computer can retrieve only that which previously has been submitted, the human mind can retrieve whole sentences, but also can reconstruct them as it pleases, gild the words with emotion and play back the words with lyrical sound and oratorical fury, calling into service the entire body to support the words. It can cause the hands and arms to provide appropriate gestures, the face to take on the correct expression, the eyes to gleam in sync with the message being delivered and it can to this all on the fly, automatically.

Thus, the presentation of the information frequently can be more important than the actual substance of the information. It is the presentation that focuses and maintains our attention. TV commercials attempt to draw immediate attention through the increase in sound volume, a cheap mechanism to obtain user attention. It is the fluctuation of sound volume and intensity, tone of voice, personal quirks and gesturers, characteristic pauses or speaker delivery techniques and antics that keep us absorbed and interested in media content. These are all methods by which we impart emotive content. However, written interfaces today are conspicuously devoid of emotional content. Yet there is a real need and even an attempt by users to embed the emotions into their textual messages. Users react positively when they receive even token emotional content back in messages, even in its current weak attempts to transmit an emotional message. Each of us has seen a ☺ inside text to demark an attempt to jest or joke. An exclamation mark! or BOLD letters to represent enthusiasm or danger. Communication in complete grammatically correct sentence structure does not maximize information flow. Information flow is maximized when it makes an impact on users. This can come in fits and starts, soft and loud, by head scratching and pausing, iambic rhythm, cadence or tempo. These are just some of the methods we use to convey emotion. It is this transmission of emotional content that is largely missing from written communication.

Most of us at one time or another have toiled trying to teach a child something that we thought was important and were frustrated when the child lost interest and turned off and quit. Later, much to our amazement, the child was effortlessly using this knowledge as if it were second nature. We may have learned that a "friend showed me how to do it." Why is that and how did it happen we may ask. The answer is that a friend imparted that knowledge, albeit probably much less precisely than you may have, in a way much less threatening to the child, perhaps more interesting but in all cases more efficient than you could have. Essentially this learning took place via a more "friendly, hence more efficient," user interface.

Warning labels are another example of this phenomenon. Label makers have found that children are much more likely to understand a face with a frown or scowl on a label to depict danger or harmful if swallowed, than a small paragraph of text explaining in simple language, the repercussions of tasting contents within. The warning face glyph has a much more powerful communication mechanism that forces the "reader", in this case most likely a non-literate, to understand in no uncertain terms, the single most important part of the message. That message is in the form of an emotional expression portending something bad. What is needed is a way to embed emotive content into written communication so that even children can understand. Since emotions are used before even language, even children should understand at least the emotive content of messages. Such understanding by a child could function as a test of a system for conveying emotion.

Teaching and learning are still an art. Tolstoy's firm belief was that art is the transmission of feelings. The face glyph is an art form, but the average person has no tools with which to impart or use this art in their written messages, which could aid in the transmission of emotions. What is needed are ways to transmit our feelings, perhaps in art form, in our written word.

Information Overload

The term information overload is currently used when referring to textual information, which inundates us and immerses us in more text than people typically can read in a day. Text language must be learned, parsed, understood and stored. What is needed is a way to assimilate messages quicker and more clearly ascertain their intent. Messages with evident emotive content would by their more visual nature be "read" much faster, assimilated quicker. Readers could understand the full message quicker, as a glance would sometimes be enough to comprehend the emotive content in a simplified form, the largest component and many times the most important component in many written communications. People don't read as fast as they see. Letters must be comprehended. Pictures, scenes and colors are much more quickly absorbed and our emotions receive input mostly from other than written word sources. In any event, effective communications appeal to our emotions and these do not come from letters and words. A way needs to be developed which will maximize information throughput.

It has been said that mathematics is the universal language. This may be the case in the sense that mathematics throughout the world uses international symbols that transcend all borders. It is said English is the language of the Internet. However, one must study and learn the English language. The true universal language is the language of the heart, emotions. What is needed is a universal way to communicate emotion in written word, which will transcend language barriers. Emotions with some small cultural differences use commonly accepted methods and symbols to carry emotive content. Most of these come in the form of gestures and facial expressions. What is needed is a way to use these gestures and symbols to transcend language barriers, so that the universally accepted symbols and methods can be used as they are in the field of mathematics, to be understood by many people of different languages.

Comfort Level

Interfaces have to be learned, they are not natural. "Natural Language" was unnatural to most people. Most people have an aversion to technology because they are not comfortable with the interface or the forced, designed way in which they must interact with a technology. Interfaces can make or break an otherwise very good and useful technology. The design of any good interface starts with understanding of the end user and how best he would like to interact with a technology. This begins with the attempt to ease the learning of the functionality of the technology and how to interact with it. Thus the more comfortable a user is with the interface, the quicker the user can learn to use the technology and be proficient—not just proficient, but to enjoy, obtain satisfaction from and master. Where there is the emotional content of encouragement, commiseration, laughter and pleasure, there is enjoyment, sustained participation, concentrated effort and increased user attention.

Most textual interfaces for the written word are devoid of emotional content in presentation of information. Where there is some allowance for emotional content, it is still primitive and user engineered. Learning the interface typically takes more effort than most users are able to muster. However, emotional content integrated with other content infuses users with energy they are striving to obtain through an interaction. Emotional content provides energy that the user can obtain and use in understanding and internalizing the message. It is the emotional and personal element that captures and holds the receiver's attention and is the mechanism used to immerse the user in order to reach its intended receiver or audience in its most complete form. There are currently limited ways of presenting emotional content in written word. That is because emotional content is filtered out in our current communication schemes. When users are able to embed some emotional content in a communication stream, the interaction is richer and the communication more satisfying. What is needed is a way to allow senders to embed their emotive content more easily inside their written transmissions.

Reading text requires concentration and effort. The maintenance of focus requires energy. An aspect of the invention is the infusion of emotional energy in conveying knowledge from others, Internet, and media space content to users. Thus, the integration of the media content with emotional content can provide a richer more complete form of communication. Emotional content can contain and convey the subliminal messages, which are vital to a user's interaction with others via technology. The addition of emotional content captures, maintains, and focuses a user's interest. Thus, if the emotional content comes through from the sender, the sender has a much purer higher fidelity communication mechanism. The receiver is then more likely to understand the communication, not just read it, hear it, or see it, but feel it as well.

Written media technology, although far reaching, to some extent acts as a damper or cushion for communication, as thoughts are expressed but emotional content is filtered out. It is filtered out in subtle ways. For example, written text has little in the way of mechanisms to express enthusiasm textually. An "!" is probably all we have in the ASCII set to show or accentuate a thought with excitement. What is need is a method for the enablement for transmission of emotive content in textual language, which can be used to overcome this technological impediment. What is needed is a way to "write" the emotive content adjacent to or within the text to make understanding more clear.

A major drawback in current emotive content capabilities in conventional Internet based web languages is that the ability to communicate emotive content is non-existent. This disadvantage is even more apparent in the case of email, Operating System interfaces, application interfaces, word processors etc. There is a need for conveying emotional content side by side with textual, visual and audio content. The non-verbal communication is filtered out in Web publishing, email, stored archives, etc. There is a need for users to have the option to reinsert emotive content into written word of all types, memo's, letters, book's, web publishing, email etc.

The expression of emotion in text is rarely tried except by writers and professionals with a large vocabulary and good writing skills. Even so, emotions and their associated magnitudes are rarely expressed textually or in writing for many other reasons. Current expression of emotive content and emotive intensity in written word are rarely used because of the difficulties involved. What is needed is a way to allow and to facilitate the insertion of emotions in the written word without regard to personal language expression and manipulation skills, vocabulary size or writing style. What is needed is a tool to aid users in the embedment of emotive content in text.

Checksum

The imperfect written word may contain ambiguities. These can cause problems in communication. Writing somebody a "thank you" note while verbally assaulting them in the written word leaves the sender and the receiver in a quandary. Sometimes one small word can change the meaning of a whole paragraph. Although follow-on messages with apologies and illuminating information can always come later to remedy this problem, this is often possible only with more work and only if irreparable damage has not been done. What is needed is a way to "clean up" ambiguities, so that there is little doubt as to what is really meant. A way to embed information, which can interpret and amplify the message, perhaps not unlike a checksum in digital coded transmission would be highly desirable to further qualify what is meant and to insure the integrity of the message is received in full at the receiver.

The issue of "mixed messages" arises when the emotive content is contrary to the carrier content. For example, nodding one's head "no" all the while saying "yes", or claiming that one is happy in a depressed tone of voice. These are examples of communication with mixed messages. Once a mixed message is discovered, typically the emotive content is given more weight than the carried text message. At times, the emotive content can resolve ambiguities in the carrier message. This is one of the "purifying or cleansing" phenomena associated with emotive content present in a message. There is a need to allow for emotive content to be carried in all elements of communication technology to improve its integrity and fidelity of communication.

It would be appreciated that what is needed is a novel system that will enable a user to recognize and discern the intended truth about a statement that might otherwise be ambiguous.

Decisions and Judgment

Emotional content in decision-making is critical. Most of us have heard the story of Solomon in judging the dispute over which woman was the true mother in a child custody dispute. He devised a test. The judgment was a decree to cut the child in half so that each woman could share equally. Although the judgment appeared an equitable solution in light of the lack of evidence pointing to the true mother, the real message was not to be understood by the false mother. The emotional content of the replies from each woman told Solomon who was the true mother. The true mother would give the child up rather than have it injured. Thus, methods to convey emotive content may be needed to provide discernment and to solve critical issues of judgement.

Previous attempts to embed emotive content include; a very primitive set of "avatars" used in chat sessions, individuals using the public domain set of emocons generated from the ASCII character set, and special character techniques like placing in text in bold or "!!!!!".

Emocons have been developed to alleviate some of the need to express emotive content. Emocons are limited to the ASCII character sets for construction, are used infrequently because of their complexity, require labor in placement, are not convenient and are cumbersome to use, need imagination to construct, and require user labor in finding a complete set for use at the necessary time. Furthermore, emocons to a large extent represent stereotypes and are more of an attempt at humor than an attempt to transmit emotive content. The foregoing generally is the full extent of attempts to embed face glyph like emotive content within text.

The avatar example, U.S. Pat. No. 5,880,731, is limited to the communication of gestures by an avatar in an on-line web chat session. These avatars represent the participants in the chat session.

Since chat is "live", the avatar gestures are conveyed through animation. The animation can comprise gestures that are indicative of an emotion. U.S. Pat. No. 5,880,731 claims "a method for communicating a gesture by an avatar that represents a participant in an on-line chat session . . . ." Gestures are learned behavior and are limited to specific cultures, age groups and fads. Gestures differ widely from culture to culture, age group to age group, and are easily confused. Mostly, gestures comprise a shallow and narrow non-verbal means of communication often found in face-to-face small talk, not unlike which a chat session can offer. The user chooses a gesture or avatar, not an emotive state, and therefore this method is emotively imprecise. For these reasons, gestures can be very misleading and misrepresent the actual emotive state and intensity desired to be communicated. Gestures also fail to recognize cultural differences and are limited and cannot be applied as a standard. Furthermore, the gestures are animated via "a sequence of visual frames portraying different views to produce an animation of said avatar." Although static frames rapidly displayed can be used in the embedment of emotive states and intensities, a dynamic approach is presented wherein for a given emotive state and intensity needed for embedment, a glyph can be generated dynamically from embedded identifiers and delimiters. The avatar reference, U.S. Pat. No. 5,880,731, also does not consider nor allow for emotive intensity or the fluctuation thereof, which is critical in the transmission of emotive content, as this provides the "ups and downs" of true emotional patterns in communication.

What is needed is a method which can provide for the user selection of an emotive state and emotive intensity, which are mapable to a face glyph. In contrast, U.S. Pat. No. 5,880,731 merely allows selection of a glyph. What is also needed is a method for selection of text to be associated with face glyphs. In contrast, U.S. Pat. No. 5,880,731 only allows for the display of the avatar in a separate window not connected immediately to any text in particular. These deficiencies in U.S. Pat. No. 5,880,731 make it unable to address the problem of unambiguous communication of emotive content or to offer a solution. What is needed is a novel way to be able to embed precise emotive content into a communication stream and to be able to likewise decode this content without ambiguity.

Although technology to facilitate writing, delivering and publishing has advanced greatly, ways have not been developed to allow for and facilitate the embedding of emotional content, emotive state or emotive intensity into email, computer, inter-computer, and web textual communication using a full spectrum multi media scheme to embed emotive content. Some emotive content in written word has crept in but has been limited to the words that contain and carry feelings and some small smatterings at basic expression with "!", and repeated "!!!!!" for emphasis. These are not what is presented here, albeit can be useful in attaining our goal, the embedding and facilitation of embedding emotive indicators or emotive content into text. Although words can and are used, they are largely inadequate in filling the needs mentioned above.

A Stitch in Time

There is also a need for synchronization of any emotive embedment mechanisms with each other and with the associated text. Synchronization is an issue with any combined mode of communication i.e. text and voice, voice and visual, visual and text, visual and voice and text. However, the emotional content is not time based, but event based. The functional relationship between emotion content and these three primary elements of communication technology are not necessarily a function of time. An event can trigger emotional response, which would "leak" into one or more modes of communication independent of time. The relationship between modes may even seem or appear random, which at times makes it difficult sometimes to understand the message. Since some modes are completely missing in most communication this adds to the burden of deciphering the emotive content for the receiver. This indicates that emotive content can be "inserted" at anytime before the message is transmitted. Moreover, although emotions are a real time phenomena, emotive content can be remembered and embedded at a later time. It is important to note that a textual message composed at some time can have the emotive portion embedded at some later time and vice versa. Many times the emotion comes first, followed by the writing. A method to compose the emotive content first followed by the text may for some, prove to be as good a way as any to compose a message, especially one "from the heart."

Rod Serling on his popular TV "Twilight Zone" series started every show with the monologue "you are entering not only the dimension of sight and of sound, but of mind . . . ." We have all long ago entered into the dimension of heart, the dimension of soul. We have mastered the dimensions of sight, visual, and sound, audio, but have yet to tap the dimension of heart, and soul in our communication save through the use of the arts. Heart and soul are the missing dimensions in our modern communication. It's understanding has been delayed and underplayed perhaps because of cultural bias. These dimensions are present in all out art forms, yet conspicuously absent from our written communication. Yet the very essence of communication is carried by the dimensions of heart, mind and soul as well as the text or substance. One hesitates to call the text portion the substance, because that may not be the true substance, only our currently accepted written communication. Written communication is becoming an all pervasive method of interfacing with one another be it over the Internet, email, electronic memos, web publishing, or word processing output. What is needed is a new method to enable more expressive ways of communicating with the written word in the context of modern media and communication technology.

SUMMARY OF THE INVENTION

In view of the above, aspects of the present invention provide ways to include emotive content in written communication. The emotive content serves many needs not currently addressed in written word and text generation aid such as word processors, web publishers, email and archives.

There is a real need and even an attempt by users to embed the emotions into their textual messages but currently there are few mechanisms by which to do this. Users react positively when they receive even token emotional content back in messages, even in its current weak attempts to transmit an emotional message. Information flow is eased when it makes an impact on readers and this is done more efficiently when emotive content can be carried in the message as well.

Aspects of the invention embed information, which can interpret and amplify the message, analogous to a checksum in digital coded transmission, to further qualify what is meant and to insure the integrity of the message is received in full at the receiver. There is a need to allow for emotive content to be carried in all elements of communication to improve its integrity and fidelity of communication.

Another aspect of the invention provides for better understanding "mixed messages". That is when the emotive content is contrary to the carrier content. Nodding ones head no all the while saying yes is the classic example of this phenomena. Embedment of emotive content can resolve ambiguities in the carrier message, one of the "purifying or cleansing" affects associated with emotive content present in a message.

Media technology, although far reaching, to some extent acts as a damper or cushion for communication, as thoughts are expressed but emotional content is filtered out. It is filtered out in subtle ways. Current emotive content capabilities in web languages, computer application interfaces, email and other modern communication means are non-existent. The non-verbal communication is filtered out in Web publishing, email, stored archives, etc. An aspect of the invention provides the means to put emotive content back into text of all types, including memos, letters, books, web publishing, email, archives etc.

Emotional content can contain and convey the subliminal messages, which are vital to a user's interaction with another via technology. Aspects of the invention provide ways for the sender or author to add emotional content, which can capture, maintain, and focuses a receiver's interest. This can also act to ease the message information flow so that the actual message has greater impact with in less time.

The expression of emotion in text is rarely used except by writers and professionals with a large vocabulary and good writing skills. Even so, emotions and their associated variations and intensities are rarely expressed textually or in writing by the average person for many reasons. Current expression of emotive content and emotive intensity in written word are rarely used because of lack of writing ability and capability. An aspect of the invention provides mechanisms, which facilitate user emotive embedment in the written word without regard to personal language expression and language manipulation skills, vocabulary size or writing style.

A further aspect of the invention aids in decision-making. Half-truths and omissions can be "filled in" with emotive tests. Such tests were designed and used by historic figures and we have examples dating from as far back as recorded history. Thus, methods to convey emotive content are needed in resolving real life problems and can now be accomplished with textual messages.

Aspects of the invention provide sets of emotive primitives and mechanisms to manipulate these primitives to represent emotive states and emotive intensities while "coexisting" with the textual message. These are primarily done through the use of face glyphs, colors, animation, fonts and also a set of "feelings" word set.

BRIEF DESCRIPTION OF THE DRAWINGS

These and other features and advantages of the present invention will become more apparent to those skilled in the art from the following detailed description in:

FIG. 1 illustrates contrasts of same intensity different emotive states employing face glyphs as applied to the same text phrase according to a first embodiment of the present invention; and FIG. 2 illustrates the contrast of increased intensity differing emotive states employing face glyphs as applied to the same text phrase according to the first embodiment of the present invention; and FIG. 3 is a sample text selected for face glyph emotive content embedment in accordance with an aspect of the invention; and FIG. 4 is the sample text of FIG. 3 with embedded emotive content employing face glyphs according to an embodiment of the present invention; FIG. 9 is an example tabulation set of feeling words used in an embodiment of the present invention.

DESCRIPTION OF THE PREFERRED EMBODIMENT

Figure 5A:
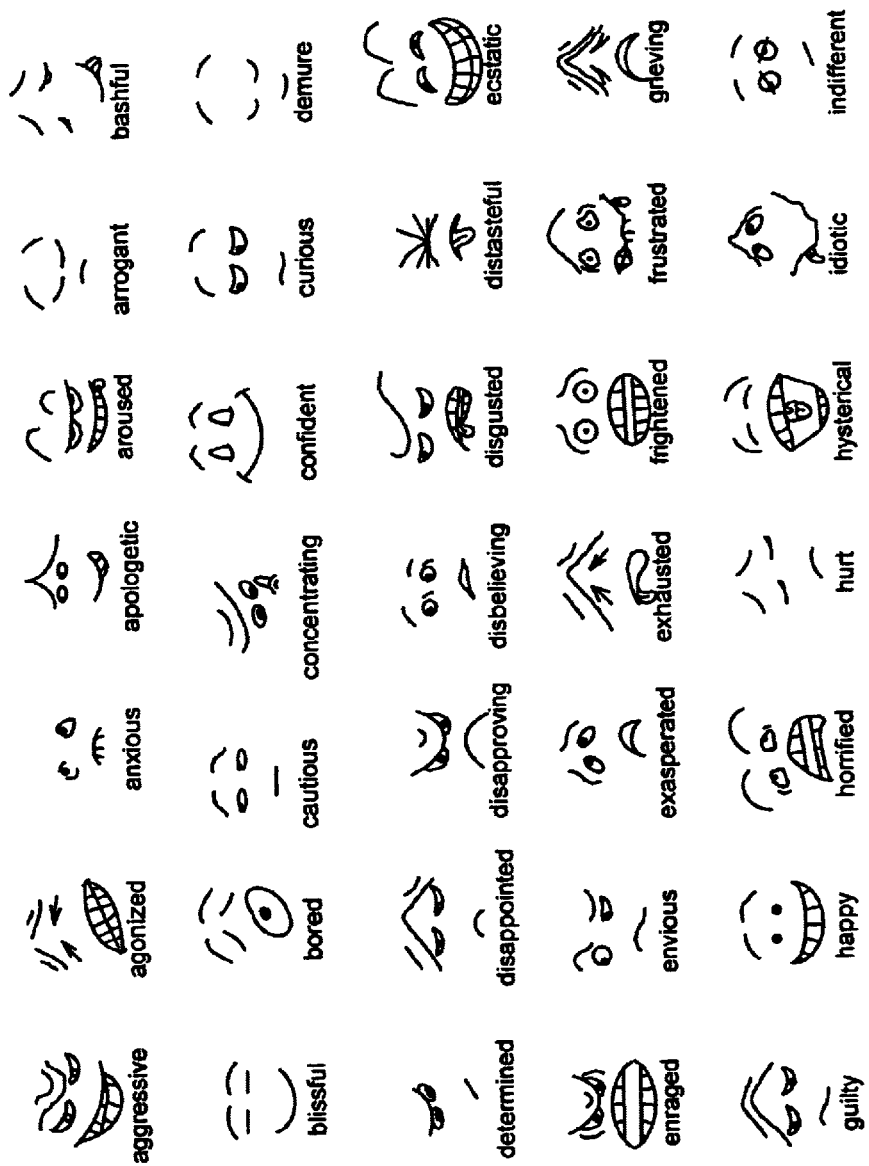
FIG. 5 shows an example set of face glyphs some of which were used in the illustration according to an embodiment of the present invention.

Humans are distinct in many ways, one of which is each has his own emotional "makeup" and emotional response mechanisms. Moreover, emotions are not boolean, but rather a vector representation. Emotions are characterized by state, direction and magnitude. The direction can be positive or negative and, rarely, neutral. Emotions can vary from mild to all consuming. The magnitude is widely known as emotional intensity or depth of feeling. Emotions also must be included in any communication scheme. The following aspects of the invention provide for the embedment of emotive content into a communication stream.

Various aspects of the invention afford distinct advantages over other text facilitation devices such as word processors, email software and publishing software. Conventional word processors, publishing software, email software, or the like do not currently facilitate emotive content embedment into text. Aspects of the invention described below provide for such a mechanism. Since feelings transcend age, culture, language, creed, race, communication and writing ability, aspects of the invention will enable improved and enhanced written communication.

One primary manifestation of emotions is facial expressions. These are universally "read" and experienced by humans starting at infancy to discern what is being expressed verbally as well as non-verbally. Although man has found many ways to express emotions, facial expressions are perhaps the most direct outward indicator of emotions in communication. Even minute differences in facial expression can "tell volumes." For this reason, it is fitting that we should make facial expressions a major vehicle to embed emotive content into text.

It can be appreciated that an aspect of the invention allows for varying emotive content, which can change the meaning of identical text or word phrases. This is inherent in the foundational concepts of an aspect of the invention. Emotive content can and does change the "meaning" of words. FIG. 1 shows different emotive states employing face glyphs as applied to the same text phrase to illustrate this phenomenon.

The emotive states of ecstatic 102, disapproving 105, jealous 108, suspicious 111, paranoid 116, innocent 117, and turned on 122 are selected each with the same intensity 103 106 109 112 115 118 121 of value 2. The intensity scale used is nominally from 1 to 10, which will apply to all of the figures and text as well.

Reading the text for ecstatic state 104, the text message is "I don't know, why should I care?" In the ecstatic state context, the author is also saying that they are pleased with their ignorance and further that what ever the outcome, its irrelevant to them. Reading the text for the disapproving state 107, the reader can infer that the author did not approve of the action or event and is washing their figurative hands of the matter. The text in jealous state 110 has the additional message that the author is responding from a resentful position, and not likely to be telling the truth even if they knew it. They may even be hiding something. The suspicious 113 response of "I don't know, why should I care?" connotes a guarded or defensive posture. The paranoid 116 response carries an unnatural overwhelming fear, which may indicate that the response is truthful and the author is fearful of reprisal. The innocent 119 response also on the face seems truthful and neutral as to the validity of the response because there is not emotive force one way or another. The turned on 122 reply has the added message of going forward perhaps or continuing the relationship because the chemistry is there. The true message is for the most part "unsaid" and carried largely in the emotive content portion.

The reader will appreciate an aspect of the invention in which identical text can have completely different meanings. The additional message components are delivered via the different emotive content of the same identical text. An aspect of the invention can be further useful in the construction of parsers, which could extract more meaning from a text message. The emotive content selected for the same text phrase changes or qualifies the meaning of the text.

Techniques to watermark the face glyph emotive content into text are well known to those skilled in the art. There are various methods of doing so, some using non-printable identifiers and delimiters to enable the emotive content to be displayed. Most full word processors and publishing software currently have the technology to accomplish this.

Another aspect of the invention enables the design and construction of emotive content parsers, which can be programmed to use emotive context to qualify or interpret the text messages. This aspect of the invention also can aid in the translation of and to foreign languages. The emotive context can be used for a foundation or to discriminate alternate possible translations, to yield the one most likely to be the intended translation. The addition of the emotive content to the translated text would add yet another validation layer on the translated text.

Another important component of emotive content is intensity or magnitude. An aspect of the invention employs several methods in order to vary the emotive intensity of an emotive state. FIG. 2 illustrates the contrast of increased intensity of differing emotive states employing face glyphs as applied to the same text phrase. An increase in emotive intensity for a given emotive state can be accomplished by increasing the face glyph density associated with the selected text.

The different emotive states "ecstatic" 202, "jealous" 208, "suspicious" 211, "paranoid" 214 and "innocent" 217 were selected with emotive intensities 203 209 215 218 of value 5, in a range from 1 to 10. Emotive content in the form of face glyphs is watermarked over identical text messages for those emotive states. The increase in density of face glyphs from 1 to 2 (from FIG. 2 to FIG. 3) adds attention to the region of text watermarked, in this fashion intensifying the emotive state to a normalized value of 5 in the text containing the emotive states of "ecstatic" 204, "jealous" 210, "suspicious" 213, "paranoid" 216, and "innocent" 219. The emotive states "disapproving" 205 and "turned on" 220 were selected with an intensity of value 9 206 221 for further illustration. The glyph density for that intensity is increased by one additional glyph. One can appreciate the overpowering weightiness of the increase emotive intensity. It is not the purpose of the figure to define the weightiness or metrics of the intensity values as function of glyph density, only to show that this can be done in like fashion FIG. 3 illustrates an example of current text format messages, text devoid of emotive content, save the written word. The written word can contain emotive content in the form of "feeling words", i.e. words that carry an emotive state and intensity in the message. These are many times overlooked by readers for many reasons. In some cases it is simply cultural bias, which may teach one to ignore emotions because they are a sign of weakness. Thus, feeling words are usually glossed over and not given appropriate weight. In some cases, one reads too quickly to discern or appreciate the feelings portion of the message. Feeling words are shown in FIG. 9 and are covered in more depth below in relation to the emotive decoder.

Whatever the reason for the lack of impact of feeling words, the expression "a picture is worth a thousand words" still holds true and is used in an aspect of the invention with the embedment of face glyphs. The four paragraphs in FIG. 3: 302, 306, 308 and 310 are enclosed in a box. This is done only for the purposes of illustrating selection of a region of text for the purposes of identifying the area, which will be associated with the text for embedment of emotive content. The text in 302 is actually highlighted as the selected text to be associated with some emotive content. Once text is selected, the emotive content to be embedded and the associated intensity must be chosen.

Increasing the face glyph size and strategic placement can depict an increase in an emotive state intensity. FIG. 4 is the sample text of FIG. 3 with embedded emotive content using the face glyphs employing these techniques. The text 302 in FIG. 3 was selected for embedment of the emotive state "sad" with and associated intensity of value 6. The result is show watermarked in the first paragraph of FIG. 4 in the form of "sad" face glyphs 402 404. Note the glyph size was increased to cover more of the text and does "bleed over" the selected text area to take more advantage of the empty spacing between lines and paragraphs. The second paragraph in FIG. 4 was selected for the emotive state of "painful" 406 to amplify the author's feeling of anguish over the war and death that subsequently followed. The third paragraph of FIG. 4 was selected to contain the emotive state of "grieving" 408 as the author's words are about the brave men who struggled and died and will be long remembered. The emotive state "grieving" was selected again for last paragraph but with increased 410 intensity 412 values of 6 in an attempt to match the author's feeling words referring to a grieving process to heal the wounds and admonishing to rededication. Scanning the text without reading we can see the emotive states contained, "sad" 402, "sad" 404, "painful" 406, "grieving" 408, "grieving" 410 and "grieving" 412. These famous paragraphs are eloquent and carry the emotive content by themselves magnificently. Moreover, the best writers probably won't have much use for the embedment of emotive content. However, a majority of computer users probably could use new technology for embedding emotional content to an advantage if necessary. The paragraphs in FIG. 4 were chosen to illustrate the embedded textual content, which would be evident in the decoding of emotive content for these paragraphs, seen in section below. It should be noted that as in FIG. 3 and FIG. 4, different emotive content would have changed the spirit and meaning of the paragraphs in FIG. 3 and FIG. 4. For example, had the author of the emotive content using face glyphs placed "happy", "ecstatic" or "enraged" in the paragraphs of FIG. 3, the reader would have received an entirely different message, one perhaps of uplifting feelings of victory and possible hate or loathing for the vanquished foe.

A Set of Emotional States and Language of Emotions

The placement of emotive content starts with a "language" or set of "tokens" representing emotive states. Several examples are set forth: feelings word list, sets of static facial glyphs associated closely with emotions, sets of colors associated with emotive states for text or glyphs or textual background or a combination of text and face glyphs generated dynamically using standard computer methods.

Figure 5B:
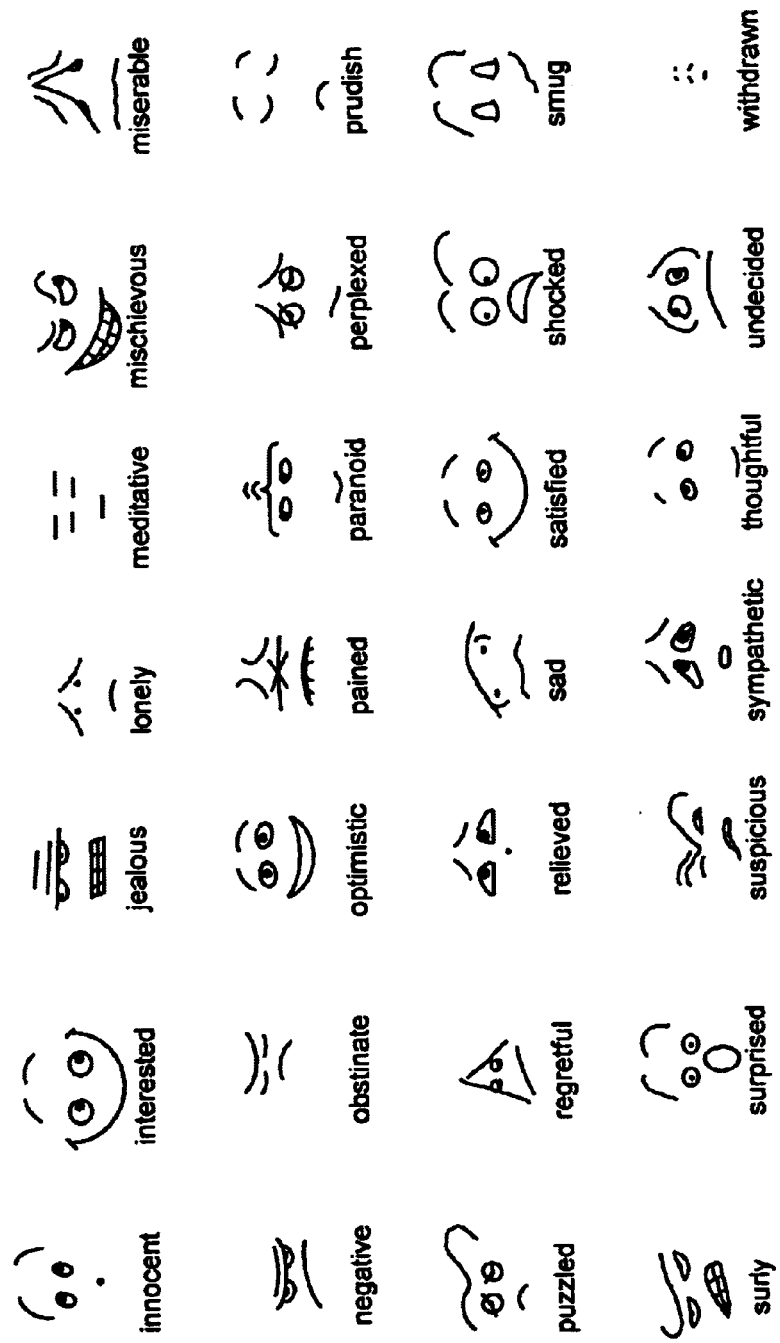

FIG. 5 shows an example set of face glyphs and their associated emotive states. We do not purport that FIG. 5 constitutes a complete set of emotive states which can be represented by face glyphs. The range of emotions is enormous and represents more emotions than can be illustrated in FIG. 5. All of the face glyphs used in FIG. 1 through FIG. 4 can be found in the set provided in FIG. 5. However, a range of emotions not mentioned can be mapped onto one of the illustrated glyphs without introducing much error; and some emotions not present can be mapped onto one of the glyphs with pronounced or decreased intensity. Because facial expressions naturally focus attention and are universally recognizable, a standard set of face glyphs representing the full gamut of corresponding emotions can be constructed and applied in multi-national multi-language computer applications. This could transcend many language and cultural barriers much like mathematics.

Emotion and Emotion Magnitude

Emotions are positive, negative or neutral but they all have a magnitude and continuity of intensities. This can be vectorized by glyph size or density as shown in FIG. 2 and FIG. 4, color intensity, glyph color intensity and music. Face glyphs themselves can be dynamically manipulated to increase or decrease the display of emotive intensity. By studying the static set glyphs in FIG. 5 we can derive a set of rules to increase or decrease the intensity of any of the static face glyphs through the manipulation of any or all of the individual face glyph components. An obvious example of this is a smile, which can be lengthened in a face glyph to show an increase in the happy emotive state intensity or the flipping of the smile for intensity increasing frown. The smile can be inverted and extended to show various intensities of "disapproval" or "regret."

Some say that depression is merely anger without enthusiasm. Words themselves representing feelings also can have associated magnitudes of emotive state. For example four words: disturbed, angry, livid and enraged; have elements of an emotive state of anger. In an embodiment shown, the emotive intensities are normalized to be between 1 and 10.

Other Devices and Methods

Other devices for carrying textual emotive content are: small pictures, FONT changes, use of color spectrum as related to modes, ASCII representatives like emocons, use of pauses e.g. " . . . ", textual changes that change from impersonal/cold to personal/warm e.g. from "the company" to "we"; Methods of depicting emotions in text are:

1) Feelings or emotion words e.g. Miserable, perplexed
2) Words carrying emotional content, e.g. The Company vs. we
3) Textual technique like pauses, commas, . . . , !, bold or diminished, fonts
4) Colors representing moods shading glyphs
5) Colors representative of moods shading fonts
6) XML presentation.

Methods of depicting intensity of emotion in text are:

1) Color intensity from diminished to bright
2) Glyph or glyph eye motion
3) Textual movement.

In short, there are other ways which can be exploited to carry the emotive content of text, some of which are mentioned directly above. Some of these are explored below. A set or "library" once defined and consistent, which can map emotive state and intensity to a representation, can be used. The power of the technology is that it can also be used to decode or help reveal the emotive content in text when needed by users. These devices can range from summaries and reports from emotive parsers, to simply "scanning" the cursor over text or dwelling the pointing device over text to have the emotive state and intensity displayed in text, much like help features of many applications use currently.

Use of XML Formatted Language to Embed Emotive Content

Since the web and computer applications could make extensive use of aspects of the invention, language and implementation should be generic enough to embed in XML, MPEG, MP3 and other communication standards such that the form of the emotive content can be implemented in ways conducive to the standard, such as the use of style sheets as other presentation is currently done in XML. XML contains a perfect mechanism to embed emotive content because its foundation is based on separating content and presentation. The content is generally referred to as the text or written word. The presentation is the portion that deals with placement of text, font, structure and mapping of text. This allows for many advantages, as the text can remain unchanged while the presentation portion can be changed to suite a variety of applications and uses. For example, the text will remain the same for a newspaper print and also as web pages for web publishing, while the presentation will vary widely. By separating the content from the presentation, one needs only work on the presentation to migrate to another application. For one skilled in the art, emotive content, because of its "presentation" characteristics, can be embedded in the XML style sheets or presentation portion. Another advantage is that web pages embedding emotive content could be dynamically altered to tailor web page to characteristics or attributes of user viewing the web page. Age, demographics, financial status and many other factors can allow publishers to more effectively reach out to readers using different emotive content implemented with different style sheets, with the same text portion. To one skilled in the art, embedment of emotive content can be built into the available web publishing tools and can spur the proliferation of web building tools and other computer applications with emotive content embedment capabilities.

Dynamic Emotive Face Glyph Set

FIG. 5 gives an example set or library of facial glyphs and their corresponding emotive states, which are general static bitmaps, each corresponding to an emotive state. Following is a method by which we can define and paint face glyphs dynamically based on a set of arguments or parameters passed to a Chernoff Faces paint program.

Herman Chernoff, a statistician, developed a method of representing multivariate data by plotting faces with features proportional to the variables from different dimensions of the data. He was able to find patterns in the data by visual inspection of the painted faces. Due to our ability to perceive minute differences in facial characteristics, Chernoff Faces method are an alternate way of depicting emotive states and emotive intensities in a way which are easily discerned by humans.

References to the Chernoff's original articles:

Chernoff, H. (1973). Using faces to represent points in k-dimensional space graphically. Journal of American Statistical Association, 68, 361–368.

Chernoff, H., & Rizvi, M. H. (1975). Effect on classification error or random permutations of features in representing multivariate data by faces. Journal of American Statistical Association, 70, 548–554.

Figure 6:
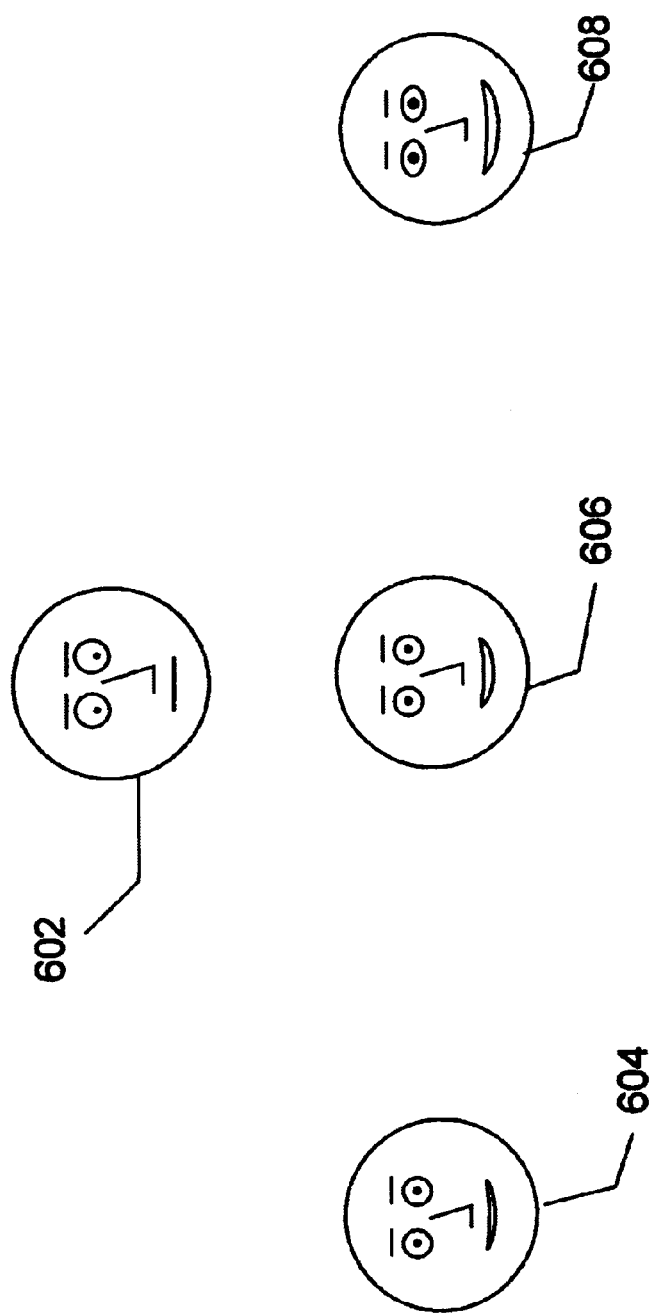
FIG. 6 shows an example of face glyphs generated by a method such as Chernoff Faces system.

FIG. 6 shows an example of face glyphs generated using a modified Chernoff Faces method, modified to use known sets of parameters for multidimensional facial feature vectors to paint Chernoff faces that represent desired emotive states and intensities. A library of multidimensional vector sets would need to be generated with a set of available face feature parameters necessary to be sufficiently complex to handle the many facial feature needed to depict the large variety of facial contortions needed to represent a full set of emotive states and emotive intensities. A very simple and rudimentary embodiment, for example only, is the use of the following set of facial feature parameters:

Head Eccentricity,

Eye Eccentricity,

Pupil Size,

Eyebrow Slope,

Nose Size,

Mouth Vertical Offset,

Eye Spacing,

Eye Size,

Mouth Width,

Mouth Openness,

Frequency of" blinking eyes.

This very short list of facial features parameters is used to generate some example face glyphs shown in FIG. 6. Each parameter is used in the settings of generating a specific facial feature or portion of a facial feature. Software programs to do this are readily found on the Internet and in programming books on most modern programming languages. Some of these public domain examples provide slider bars, which allow a user to vary any one parameter to demonstrate what the resulting face would look like. By manipulating the sliders, one can quickly scan through a continuum of variables, and find sets of parameters that would provide an emotive state and associated intensities for any number of desired emotive conditions.

The face glyphs in FIG. 6 are generated in like manner. The facial glyph features for a "neutral" emotive state are shown in 602. Let us just for example say that the parameter set using the 11 parameters was (1, 1, 1, 1, 1, 1, 1, 1, 1, 1, 1). The reader will note the "neutral" straight-line mouth and blank expression. Using a parameter set of (1, 1, 1, 1, 1, 8, 1, 1, 1, 1, 1) we can make the "happy" emotive state which can be seen in face glyph 604, where the mouth (parameter 6=8) is then painted open. In face glyph 606, defined by parameter set (1, 1, 1, 1, 1, 8, 1, 1, 7, 1, 1) the mouth slightly wider (parameter 9=8) and the vertical spacing is slightly lowered in the mouth (parameter 6=7). This makes for a deeper smile and "happier" face, a perceived gain in happiness or happiness intensity. The next face glyph 608, defined by parameter set (1, 1, 1, 1, 1, 8, 1, 7, 9, 1, 1), has a slightly even more wider mouth (parameter 9=9) and a more slightly lowered vertical spacing making the appearance of a bigger grinning face. The larger grin in conjunction with the larger eye size (parameter 8=7) give the appearance of a beaming even happier face. The emotive states and associated intensities are tabulated below along with the FIG. 6 face glyph parameter sets

| Emotive State | Intensity | Parameter Set |
|---|---|---|
| 602 | 0 | ( 1, 1, 1, 1, 1, 1, 1, 1, 1, 1, 1 ) |
| 604 | 1 | ( 1, 1, 1, 1, 1, 8, 1, 1, 1, 1, 1 ) |
| 606 | 4 | ( 1, 1, 1, 1, 1, 8, 1, 1, 7, 1, 1 ) |
| 608 | 6 | ( 1, 1, 1, 1, 1, 8, 1, 7, 9, 1, 1 ) |

In like fashion, a library of face glyphs can be constructed with gradations of intensity in any selected emotive state. Although all of the above parameters used in the above example embodiment are of a symmetric nature, any number of asymmetric parameters can be defined, added and applied in more complex face glyphs. The bit maps of FIG. 5 illustrated that most emotive states are quite often an asymmetric contortion of the face requiring a more complex set of facial parameter to adequately describe emotive states and associated intensities.

Facial features would be developed for each emotive state and intensity and then saved in a library, whereby a set of parameters would describe a face glyph representative of a particular emotive state and intensity. Thus, the input to the library would be a set of parameters for a desired emotive state and intensity and the output of the library would be the representative face glyph.

It can be appreciated that by varying certain facial features, one can paint glyphs of any emotive state and intensity. Once one is satisfied that a particular face glyph so generated can represent a particular emotive state and intensity, one can create a library of numerical parameters associated with emotive states and corresponding intensities.

Chernoff faces, a standard method of representing multivariate data, developed by statistician Herman Chernoff, can be found in the public domain as well as other sources. One software implementation, "*Computers, Pattern, Chaos and Beauty*", by Clifford Pickover generates Chernoff faces which are described by facial characteristic parameters: head eccentricity, eye eccentricity, pupil size, eyebrow slant, nose size, mouth shape, eye spacing, eye size, mouth length and degree of mouth opening. Facial features are normalized or "scaled" such that the feature is proportional to the area in the face where it will go. For example, a number between 0 and 1 can represent each parameter adequately if 0 is the no change indicator and 1 is the largest change in the facial feature. Adding more parameters and or different additional facial characteristics can expand the simple method show above to paint more complex features. FIG. 6 uses facial parameters Head Eccentricity, Eye Eccentricity, Pupil Size, Eyebrow slope, Nose slope, Mouth vertical offset, Eye Spacing, Eye Size, Mouth width, Mouth openness as the basic facial parameter set to paint each glyph to illustrate that for a desired emotive state for example "happy."

The facial features that were varied to illustrate the concept of varying facial features to change the emotive intensity were: Head Eccentricity, eyebrow slope, mouth vertical offset, mouth width, mouth openness, and eye eccentricity. Each feature can have a parametric range descritized from 1 to 10. The emotive states can themselves be defined by a superset of parameter values, which define perhaps the state at a default intensity parameter in the case of FIG. 6 above, equal to one. As the intensity requirements change, the facial feature parameters that define the higher intensities can be superimposed or added to the default values to paint the complete emotive state and intensity in the form of additional face features, symmetric or asymmetric.

In general, Chernoff faces are very useful representing large numbers of data very efficiently. The technique is currently applied as a novelty in screen savers and toy software applets, which allow users to vary parameters and observe results. However, no one has used the technique of building a complete set of emotive states and state intensities based on manipulation of these Chernoff faces parameters for use in conjunction with text or written word. The power of dynamic construction of face glyphs is in the economy of transmission as well as speed and storage. Numbers representing input parameters to any specific emotive state and intensity can be imbedded as non-printable characters or in style sheets which can be transmitted without attached static bitmaps or vector graphics. This would save storage and reduce bandwidth requirement resources in transmission. The receiver side can then read the embedded face glyph parametric representation and construct the glyph. Alternatively, identifiers representing static bitmap glyphs can be resident on both sides of a transmission and used to dynamically embed static graphics into the text presentation as well.

Studies have been made of reactions to "artificial faces" like Chernoff faces, caricatures or anthropomorphs (realistic human faces). Three such study groups attributed minimal agency and intelligence to Chernoff faces. A Japanese group considered caricatures and anthropomorphs about equal, and European Americans rated anthropomorphs highest. Both groups attributed far more intelligence to a face with "live" (blinking) eyes. Blinking eyes can be incorporated into Chernoff faces for the implementation of emotive state and intensity in a face glyph or graphic embedded with text, to carry the emotional content more "intelligently".

There are several advantages of dynamically generating face glyphs over the use of static bit map face glyphs shown in FIG. 5. One of the advantages of the Chernoff method is that face glyphs can be generated dynamically based on the above numerical parameters used in defining face glyph feature dimensions. Thus, only the parameter set of each embedded emotive state and intensity need be stored or transmitted, reducing the required resources needed for storage space or transmission bandwidth. Another distinct advantage is in the emotive intensity content. The dynamic Chernoff face method allows for a continuum of emotive states and selected emotive intensity within each face glyph as seen in the emotive intensity transition from 604 through 608, which illuminates the need for higher face glyph densities watermarking the text and varying glyph sizes to depict the selected emotive intensity. Thus, the emotive content using dynamically generated Chernoff face glyphs can be displayed over a smaller area resulting in less interference with text, simultaneously adding a more precise emotive intensity.

Figure 7:
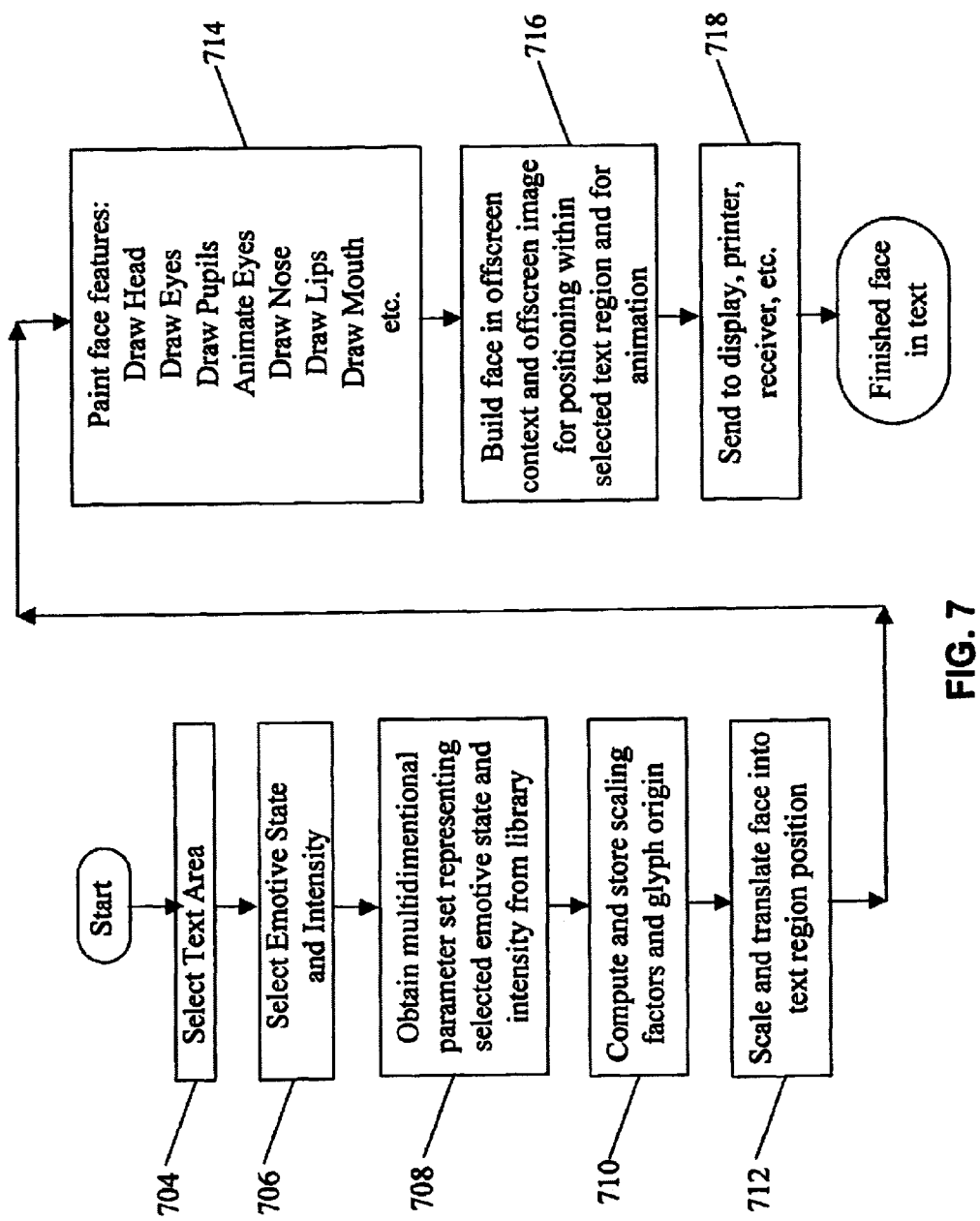
FIG. 7 is a high level block diagram illustration of the process of generating Chernoff Faces from parameter sets.

FIG. 7 is a high-level block diagram illustrating the overall Chernoff face building process. First an area over which an emotive state will subtend 704 is selected. The emotive state 706 and associated intensity is also selected for the chosen text region. Once the emotive state and intensity are known, we can obtain the multidimensional parameter set 708 which translates the desired emotive state and intensity to facial features in a face glyph from a library constructed in manner similar to the one outlined in FIG. 6. The method of painting Chernoff Face glyphs is well known to those skilled in the art. The software to generate Chernoff facial glyphs typically computes and stores the scaling factors 710 and glyph placement origin positions. The software then paints the facial features in the face glyph 714 using the input parameter set shown above, a facial feature at a time. This is then built in off screen context and off screen image memory buffers 716 for processing economy speed, for positioning within the selected text region and for animation. These graphic context memory buffers are then sent to the display device for display or printing.

Color and Feeling

Some colors have a soothing effect while others stimulate us. We experience some colors as warm and others as cool. There appears to be a direct relation between the colors that surround us and how energetic we feel. This energy may not manifest itself in the form of physical energy. Looking at the right color won't enable one to run a marathon. But one may feel a sense of strength. The opposite is also true: dark and dull shades not only have a depressing effect, but also may a cause feelings of fatigue and listlessness.

In psychology and psychiatry it is common knowledge that there is a link between colors and the human spirit. Dark and drab colors tend to depress a person, while bright and clear colors may have an uplifting effect on the spirit. Soft shades of pastel often have a soothing effect while contrasting combinations of primary colors may cause feelings of restlessness. We also express our feelings in colors. Persons suffering from vital depression have often been observed to paint in shades of gray and black, but as therapy progresses they start to use more lively colors. Colors are also determined by character. Someone with an extrovert personality may prefer brightly colored clothes, while more introverted people often wear more neutral colors. Men and women also have their own color preferences. Many women prefer the 'softer' shades, like pink, pastel shades of green and yellow, or creamy white. Men on the other hand, often have a preference for 'harder' colors, such as blue or red. However, it should also be noted that many men are a bit shy of expressing themselves in colors.

The above shows that there is a definite link between colors and our moods, feelings and mental functioning. In fact, it is safe to say that colors are linked to the human soul. (For the moment, we will loosely define 'soul' as that part of the human spirit that feels and experiences on a non-verbal level, as opposed to that part that deals with mental processes such as thought, critical analysis and speech.) Apparently, the soul is able to register feelings and emotions in response to certain colors or color patterns. In other words, colors are an important form of non-verbal communication. In this respect colors closely resemble music; a form of non-verbal communication that expresses feelings and emotions in tone and melody.

The increasing use of abstraction in graphic art may indicate a change in development in human awareness. Used in this way, colors are a link between the soul and the physical level, a way to express on the physical level something that takes place in the soul and cannot be put into words. Written textual messages can also therefore consists of totally emotive content. Deep and powerful messages that represent only feelings can be transmitted.

Intensity

Intensity is the brightness or dullness of a color. The most intense colors are found in the center of interest area. Intense colors will demand the viewer's eye, but may not keep it there very long if it is too intense and not handled well. On the other hand a fruit or flower may appear dead or rotting if it is too dull. The only way a color can be made more intense is to add more pure pigment. Bottled colors are toned and may have many resins or additives that affect the pigment, but still very intense or dull, and not exactly what you need in a painting. It is up to you to learn how to control the intensities to meet your needs.

A color can be made to appear more intense by setting it next to its compliment. When complimentary colors are next to each other they set off a vibration that makes them appear more intense, and certainly affect how we feel and relate to those combinations. We see and use this concept daily. Our holiday decorations at Christmas are red and green; in springtime we always see yellow and purples. What about Halloween with its orange and blue-black? The three primary colors are red, blue and yellow. The secondary colors or the primary colors compliments are green, orange and purple. We have many options to change the intensity of a color, they include add black, add white, add gray, add neighbor color, add earth color, add background color, add its complimentary color.

Color intensity can be mapped to emotive intensity in many different ways, thus providing yet another mechanism by which emotive intensity can be embedded into textual content. The font or the face glyphs can contain the color intensity needed to represent a selected emotive intensity. Some color mappings are simple and universal. For example, the color red is associated with strong emotions such as anger. There are various shades of red for the levels of anger or embarrassment, green for jealousy or envy and blue for sadness and depression. The shades lighter to darker usually represent less intense to more intense variations of those emotions respectively. These kinds of mappings can produce a robust set of emotive states and intensities as functions of colors and color intensities.

Figure 8:
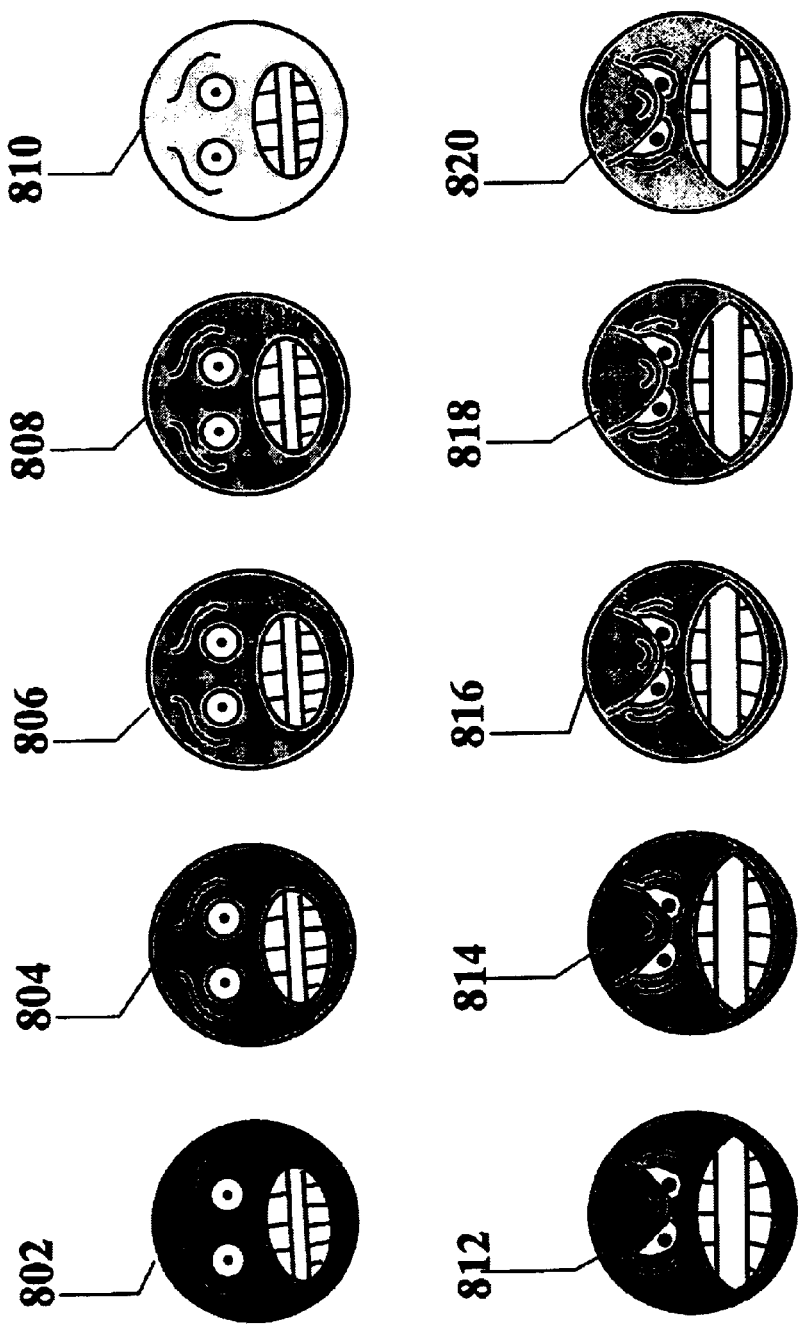
FIG. 8 illustrates emotive intensity as varied through the use of gray scale or color map intensity according to another embodiment.

A simple embodiment of color and color shades as a function of emotive state and intensity is illustrated in FIG. 8. However, because of requirements restricting color, FIG. 8 illustrates emotive state and intensity as a function of color shades in a gray scale world. Using any standard color scale, we can map emotive intensity to colors and color shades. For example, for the emotive state "frightened", right to left, 810, 808, 806, 804, 802 are face glyphs which are shades of blue starting from a light blue 810 and ending with a Navy Blue 802 face glyph. These correspond to emotive intensity variations in the emotive state "frightened", less frightened to more frightened, with increasing emotive intensity values from 2 to 10 respectively by two. Any basic color composition can be described by a quantity of three colors of the 24 bit RGB standard: red, green and blue. Using the 24 bit standard, each of the color shades used in the face glyphs 810, 808, 806, 804, 802, respectively are as shown in Table 1 infra with their corresponding 24 bit color shade in components of the standard colors, red, green and blue. The reader will appreciate that the color name is an approximation of the true color. The color shade representing the emotive intensity value is purely subjective and used as an example to represent emotive intensity by color shades.

TABLE 1

| Face Glyph | Emotive Intensity | Color Shade | (Red,Green,Blue) |
|---|---|---|---|
| 810 | 2 | Light Blue | (6,13,16) |
| 808 | 4 | Med Blue | (6,88,165) |
| 806 | 6 | Sky Blue | (53,180,253) |
| 804 | 8 | Teal | (152,203,244) |
| 802 | 10 | Navy Blue | (186,240,244)) |

The emotive state "enraged", left to right, face glyphs 820 818 816 814 812 have color shades representative of emotive state "enraged" with intensities of less enraged intensity value 2, to more enraged intensity value 10. For the emotive state "enraged", right to left, 820, 818, 816, 814, 812 are face glyphs which are shades of red starting from a peach 820 and ending with a red 812 face glyph. These correspond to emotive intensity variations in the emotive state "enraged", less enraged to more enraged, with increasing emotive intensity values from 2 to 10 respectively by two. Their corresponding 24-bit color values in components of red green and blue are tabulated below in Table 2.

TABLE 2

| Face Glyph | Emotive Intensity | Color Shade | (Red,Green,Blue) |
|---|---|---|---|
| 820 | 2 | Peach | (256,45,6) |
| 818 | 4 | Pink | (255,52,5) |
| 816 | 6 | Light Red Orange | (254,65,40) |
| 814 | 8 | Red Orange | (246,150,128) |
| 812 | 10 | Red | (244,207,198) |

This embodiment serves to illustrate a way to use shades of colors to represent the emotive intensity associated with an emotive state.

Feeling Words

The current most popular method of conveying emotions in text is through the use of "feeling" words. Most "feelings" words have associated emotive intensities as well as emotive states, for example "angry". On the emotive intensity scale, words for "angry" are; "disturbed", "angry", "livid" and "enraged", to name only a few. Normalizing the most mild textual word form for the "angry" emotive state as 1 and the most intense emotive state for "angry" as 10, we can weight and tally the emotive content in purely textual messages. Thus "disturbed" might be given a weight of 2, "angry" given weight of 5, "livid" an 8 and "enraged" a 10 in the emotive state of "angry".

A list of "feeling" words can be found on Table 9. As in the glyph library example, this is not a comprehensive list but serves as an example for the simplest preferred embodiment of the principles introduced here. Those skilled in the art of psychology and human behavior are familiar with these "feeling" words and the usage of such words to express emotion in written and oral communication.

Another example of the use of feeling words would be taken from FIG. 3. Parsing the paragraphs in FIG. 3 for "feeling" words, we find "dedicated", "so dedicated", "increase dedication", "dedicate", "consecrate", "hallow", "brave", "consecrated", "be dedicated", "honored", "increased dedication", "nobly", "full measure of devotion." The reader will note that the feeling words can have many grammatical forms. The feeling words also may be used in conjunction with "helping" words, like "so" and "increased" and "be". These helping words can have the affect of increasing or decreasing the intensity of the feeling words.

Words having the same general emotive state, but different shades of intensity as "dedicated" might be: devoted, enthusiastic, keen, fanatical, committed, and uncommitted. A range of many of these feeling words can be found in a thesaurus under the word in question. Let us weight the feeling words by assigning the highest weight to the most intense emotive state feeling word and the lowest value to the least intense emotive state feeling word:

Let "uncommitted be weighted a 1
Let "fanatical" be weighted a 10
Let "devoted" be weighted an 8
Let "committed" be weighted a 5.

Using the normalization technique shown above, we can derive an approximate intensity for the feeling word "dedicated", which should be approximately weighted a 7 based on the surrounding intensity feeling words of the same general emotive state.

Scale words and phrases like "full measure of", "so", "be" should weight the feeling words more heavily. If we assign values to the particular feeling words and scale the values up or down with the scale words and phrases, we can come up with a numerical figure of merit which can tell us how much emotive content there may be and whether it is positive or negative and how much it fluctuates between them. The weights of the feeling words can be tallied by emotive state, emotive intensity per state, total emotive content tally, etc. These can be used in reporting or summarizing the textual emotive content in text.

Parsing a passage for feeling words and making a note of the emotive content is sometimes done and an end report result could be a "positive note", a "negative note", "up and down", "ambivalent" and so forth. At times it is very important to know the precise intensity of the emotive state. Sometimes the truth of an action or intended action directly follows the intensity of the emotion. The statement, "He wasn't just angry, he was livid." Or the question, "well how mad was he?" can be answered, even if we are in hurry and fail to read the entire text. It will be appreciated that an automated computer feature to perceive and make an accounting of the emotive content, and quickly report the overall feelings of a message advantageously would provide a means for us to decode emotive content. FIG. 9 gives a starting point for parsing text for "feeling" words and keeping a running tabulation for textual emotive content.

Strategies on How to Embed

Interference from watermarking face glyphs on text can occur which can make reading the text difficult. Embedding emotive content into text for display as shown in FIG. 1, FIG. 2 and FIG. 4, must be done with some care, as the two content streams must co-exist on the display or screen. The face glyph placement process begins with the given or selected emotive state, intensity and area to be mapped. The placement algorithm must map the glyphs to the text area with minimum interference in watermark fashion i.e. the glyphs should not obscure the text in a way to make the text unreadable. This can be accomplished in various ways such as keeping the glyph lines a shade lighter in color or gray scale the text, increasing the size of the glyphs across the mapped area so that any glyph line underlying the text will be recognizable from the large non crossing portions, making maximum use of free space, margins and line spacing, and the like.

FIG. 5 gives an example set or library of facial glyphs and their corresponding emotive states. These are general static bitmaps each corresponding to an emotive state. They can be applied in various ways in the area of the text where it is intended for the emotive state to reside. The glyphs can be placed between the lines of text, in the margins, watermarked behind the text etc. The face glyphs must be placed into the target area in a way so as to reduce interference from the glyphs with the text. This can be done using several techniques such as max use of white space, maximum use of margins and between text areas, increasing text spacing, AND'ing inside face glyph feature memory buffer pixels with text occupied memory buffer pixels to find a minimum of overlap or interference, etc. Another simple implementation can just place the glyph in the mapped area using thick black fonts for text and lighter watermarked shades for the face glyphs. To then vary the emotive intensity, one can vary the density of said glyphs, vary the size of said glyphs, apply higher frequency blinking or animated movement in general, vary the color intensity or the glyphs and or text font and methods of the like mentioned above.

Figure 10:
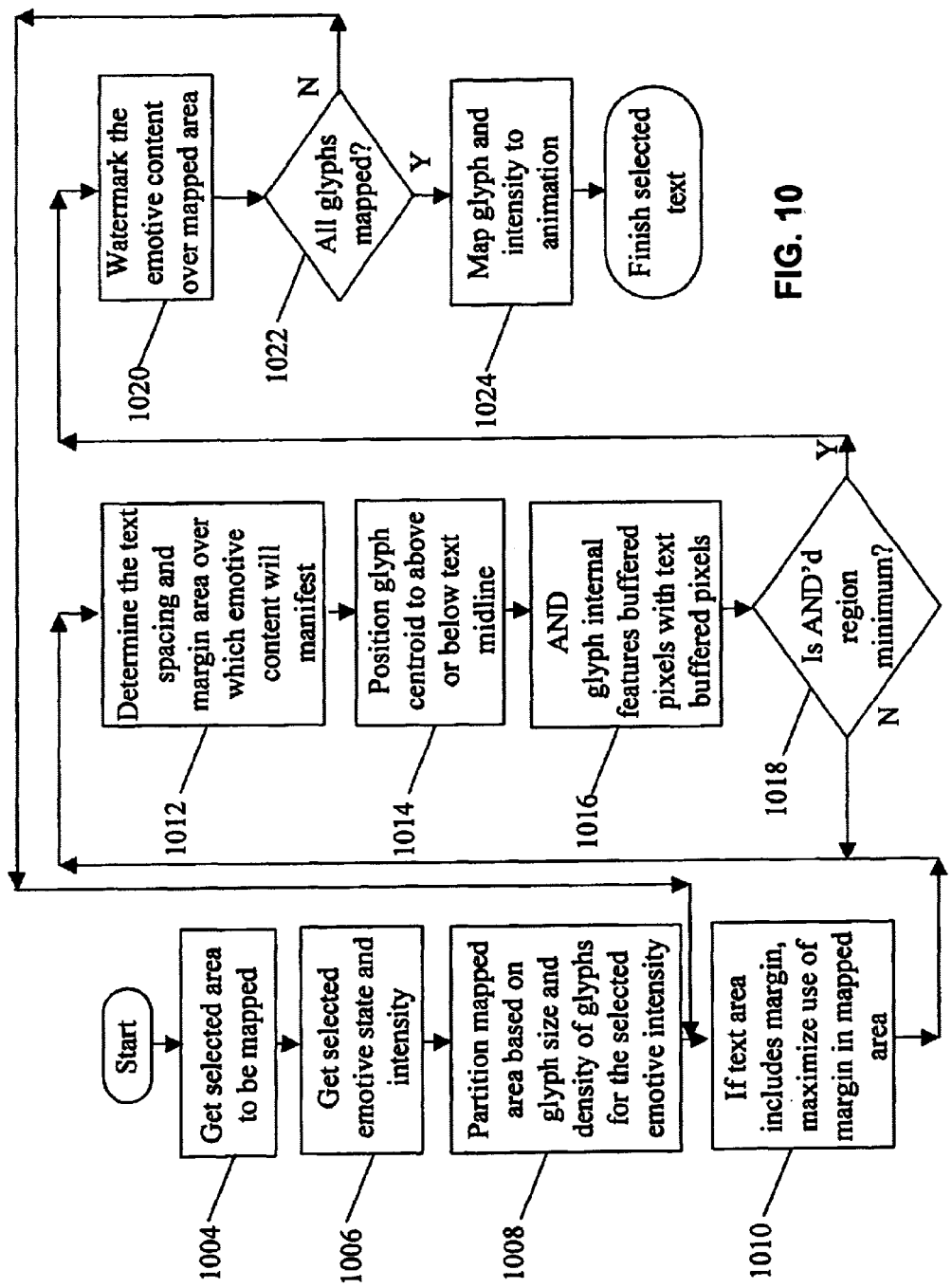
FIG. 10 is a high level block diagram illustrating process of placing a glyph into text space in accordance with an aspect of the invention.

FIG. 10 provides a block diagram illustrating the process of placement of glyphs into text region. As with the embedment process, the placement or mapping process starts with the selected area to be mapped 1004 and the selected emotive state and emotive intensity 1006. The selected area is partitioned 1008 based on the number and size of face glyphs which will watermark the text area and be representative of the emotive intensity. The density and size of the glyphs will be a function of the emotive intensity and the total size of text region to contain the emotive content. This will include the surrounding margin space 1010 as well as the space between paragraphs and lines. The next stage is to choose the text spacing and margin areas to have the least overlap of text 1012 with the face glyph. A candidate position 1014 would be to position the glyph centrally, above or below the text centerline with least overlap between the facial features and the text. The glyph occupied pixels would be summed by a logical AND with the pixel occupied by text in the selected area. A logical AND operation would yield the number of pixels that are common to both 1016 the glyph internal face features and the text. This manipulation of course is performed in video and memory buffers, iteratively at 1018 before painting the screen and after 1 a minimum interference factor is calculated. Once a minimum interference position is found, the glyph is watermarked with 1020 with the text and the next glyph 1022 to be embedded is applied 1022 in like fashion to the next partitioned area. Once all the glyphs have been mapped, the glyph's eyes can be animated 1024, or color shades added for emotive intensity.

Emotive states can be assigned identifiers and such identifiers in conjunction with delimiters and placement coordinates, can be embedded in the text as non-printable characters much like presentation information is now done with non-printable characters in most text processors, publishing software, email and almost all newer applications. These techniques are well known to those skilled in the art.

When to Embed

Figure 11:
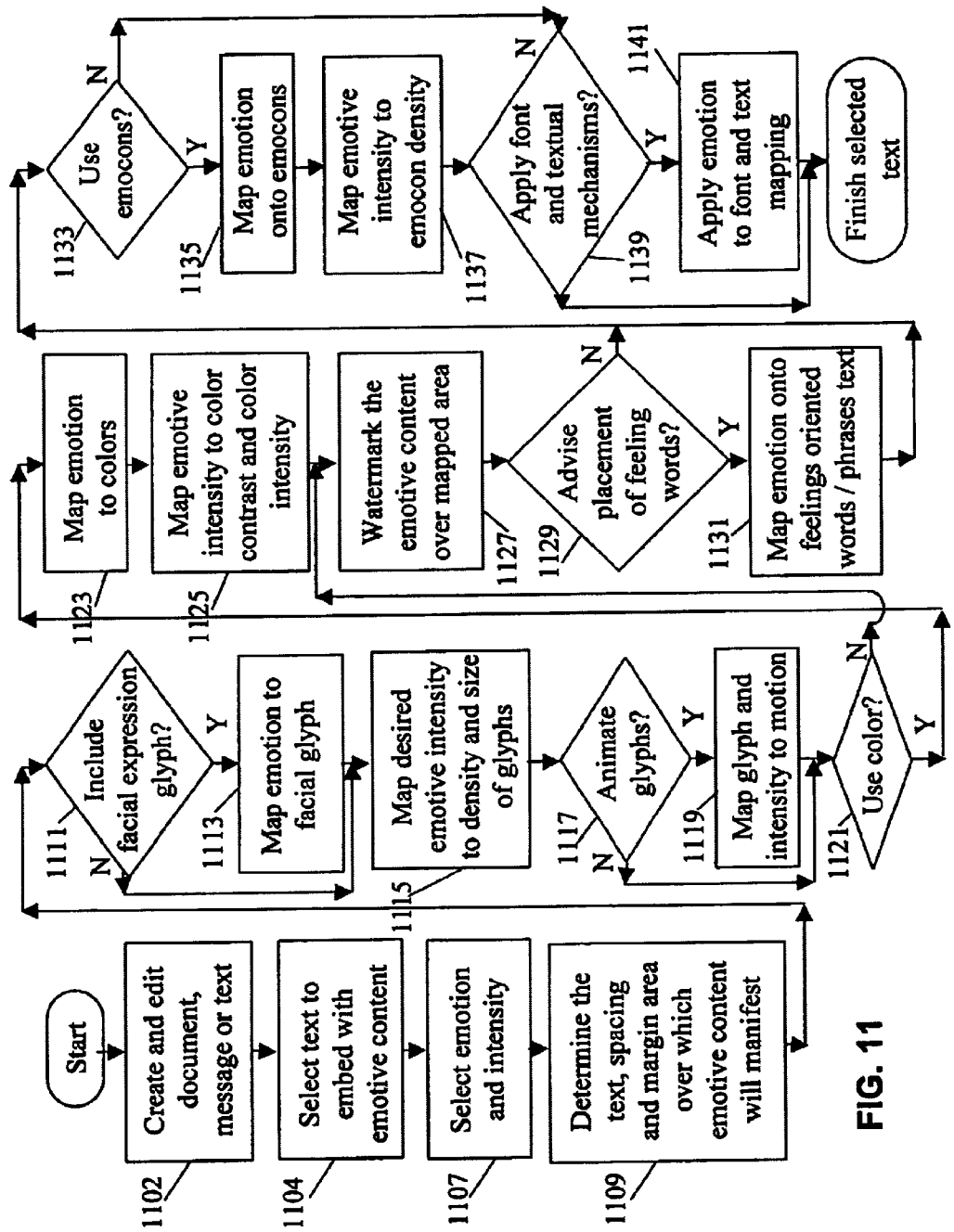
FIG. 11 is a block diagram showing the flow of user options approach for the encoding and embedment of emotive content through various techniques in accordance with an aspect of the invention.

FIG. 11 is a block diagram showing an embedding process flow of user options for the encoding and embedding of emotive content through various means shown above. The process starts with the creation of the text region 1102 which could have been created in a text document, email, publishing application or other text creating application. The user then selects the text over which he wishes to embed emotive content 1104 and emotive intensity 1107 for the emotive content. The text region to include, emotive content and additional white space are determined at 1109, over which the emotive content and text will be merged. The user would have the opportunity at some time to choose which emotive content embedment methods he will apply in the text. These can be set at an earlier time and used as default settings, changeable on, but otherwise are enabled or disabled by the user. The first such option would be the face glyph expression option 1111. An enable check there would dictate the use of Face glyphs for emotive state and intensity selections 1113. The emotive intensity 1115 is applied next in using any of the static or dynamic face glyph emotive intensity methods shown above. The next option 1117 would be whether to animate face and glyph face features. An affirmative here would proceed with the animation 1119 process that further brings us to the use of color option 1121. This option, when enabled, would allow the process to proceed to map emotive states to color 1123 and color shades 1125 for emotive intensities. The non-chosen route would just apply the gray scale to the face glyphs. The placement and watermarking process follows 1129, if there is emotive content to embed in the process. Much like a grammar advisor, a feeling word placer will embed feeling words in grammatically correct text structure in the selected text to ease the writing chore for the user 1131. These changes are offered as options, which can be used or not depending on the author's inclination and suitability of the offered additions. A stored set of emocons 1133 can be offered as an option, which if used could then map the emotive state to a library of available emocons 1135 and their associated intensity 1137. There are also font and textual mechanisms 1139, which if the option is enabled, can be applied at 1141 to the selected text as well. It is highly likely that not all emotive content mechanisms will be selected to be enabled simultaneously, as some mechanisms will overlap others. In the case of emocons, some are clearly inferior mechanisms to impart emotive content from their inherent limitations mentioned above. They are included here for the sake of illustration and completeness.

An advantage of the embedding process is that the user (producer, publisher, sender) will embed the emotive content that he wishes, at a desired time, in whatever type of communication the user may be attempting, be it email, a memo, text file, web page, etc. A combination of methods approach provides cohesion and improves the strength and collaborating veracity of the "end product", emotional content. Furthermore, words, phrases and sentences can be inserted at selected text locations at the author's discretion in operatively grammatical format, much like a grammar checker can currently parse and recommend better grammatical structure.

Decoding for Emotive Content

Figure 12:
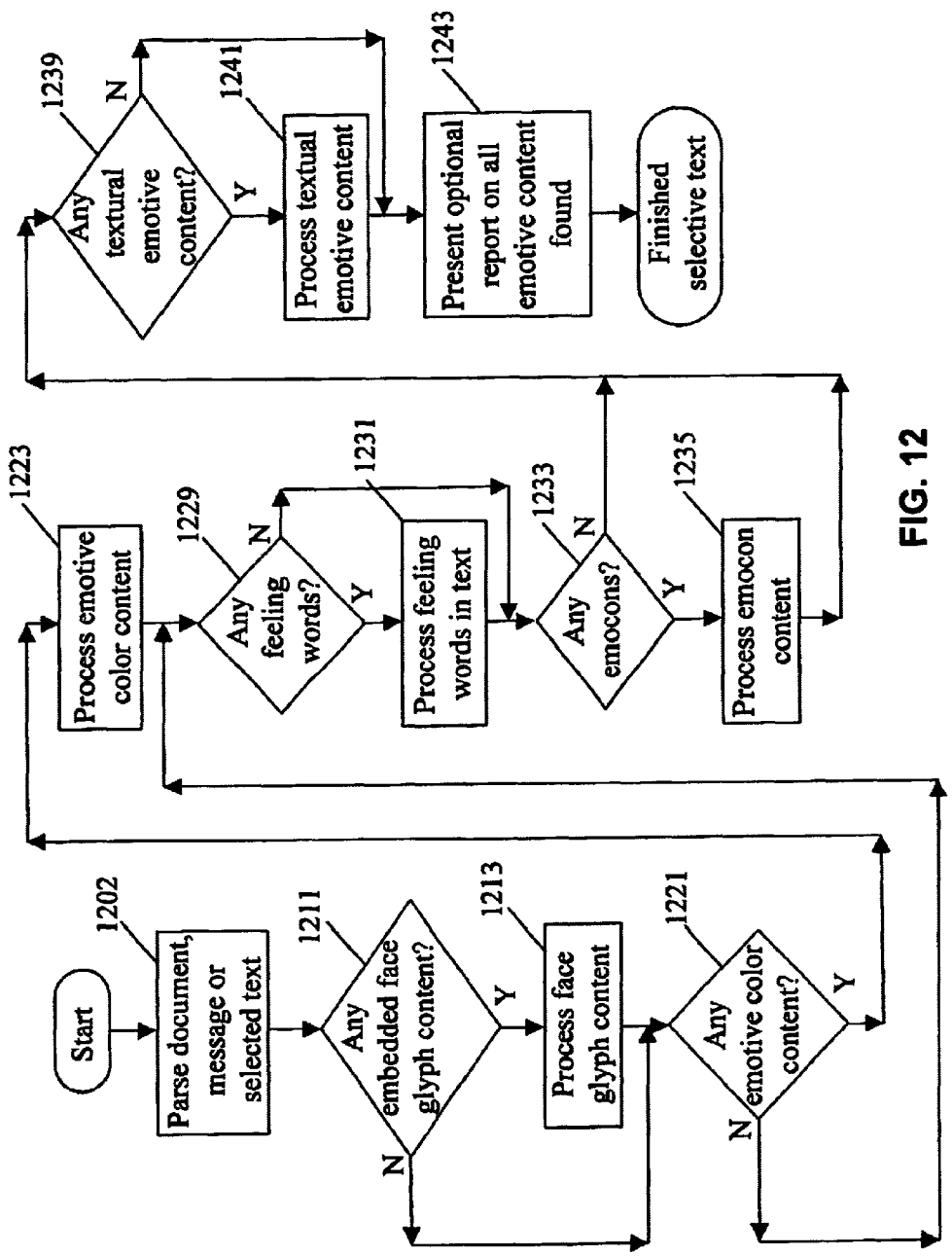
FIG. 12 is a block diagram showing the decoding process of emotive content from text in accordance with an aspect of the invention.

FIG. 12 is a block diagram showing the decoding process of emotive content from selected text. The overall process will optionally parse for already embedded emotive glyphs and or emoticons, for emotive technique structures, and then parse for feeling words.

Embedded emotive glyphs, colors and fonts can be parsed to reveal their emotive types and intensities in an already emotively encoded text. As mentioned above, words themselves representing feelings also can be decoded for emotive content and reported. Any given text can be parsed for "feeling" words and the emotive content can be summarized in a report, graphically illustrated with face glyphs or in text format. The summary would show the emotive elements and associated emotive intensities. These could be powerful indicators to people searching for certain truths or alternate meanings in the text.

The emotive decoder would logically start with a selected text, message, page or document 1202. The user will be free to enable only desired options in decoded embedded emotive content.

Choosing face glyph decoding 1211 would stimulate the process of finding and translating emotive content and emotive intensity, and tabulating 1213 any and all face glyphs found in the selection. The color option 1221 will stimulate the process to translate colors and shades 1223 of emotive state and intensity to the textual identification of the color coded content. The next stage may be the option to parse for feeling words 1229 and process these into the 1231 report. If the emocon decode option 1233 is enabled, the parser can 1235 can "look" for these and tabulate finding in report as well. The means to parse for different things is the nature of a parser. The application of a parser is well known to those skilled in the art, and such a parser may be readily implemented by one skilled in the art. As mentioned above, there are other textual emotive content techniques which are primitive, but can contain some emotive information. These can be parsed in 1241 if desired 1239. The completed process can tabulate all emotive content and intensities found in the different schemes mentioned above. This information can be summarized to answer questions like, "was he angry?", "how angry were they?", "do they mean business or are they just playing?", "how serious are they?"

As mentioned above, emotive parsers are a step above decoders. Programs which can decode emotive content are the front end to the emotive parser. An emotive parser would employ "grammar" based on emotive context as well as the parts of speech. The addition of emotive context into deciphering text as shown in embodiments above, can conjure vastly different meanings in the text which could be accounted for only through first the precise identification of and then the use of embedded emotive context.

Aural Indicators

As is well known to one skilled in the art, computer text can be vocalized by any number of convenient methods and by many vendors offering products for text to speech translation. Using any of these well known technologies, another output method, aural output by various triggers, may be employed to reveal embedded emotive content. Dwelling the cursor over the embedded emotive content can trigger the aural enunciation of the emotive content. Alternatively, quickly running the cursor over the text may trigger an aural output of the emotive content even while the reader is parsing the text.

In an aspect of the invention, emotive overtones and meanings can be selectively imposed upon text such that the vocalization of the text can produce the emotion that a human voice might carry for any particular emotive state and intensity. Thus, depending on the reader's inclination, he can select an option to hear the selected text vocalized with the emotive overtones, or just the emotive content.

A further aspect of the invention can coordinate sound with animation such that emotive content is synchronized with verbalized sound and facial movement. For example, smiling or blinking, can be synchronized with the words vocalized with their associated emotive overtones.

Concluding Remarks

Presented herein are a variety of means and methods for embedding emotive content within text. Many of these may seem "wooden", and not capable of bringing to life the "real thing", that which we call emotion. While the invention will not replace true art, which is the transmission of emotions, we submit that the embedment process as outlined in the foregoing aspects of the invention provide a solution in an evolving process to express ourselves better.

While this invention has been described and illustrated with reference to particular embodiments, it will be readily apparent to those skilled in the art that the scope of the present invention is not limited to the disclosed embodiments, but on the contrary, as set forth above, is intended to cover numerous other modifications and equivalent arrangements. Such equivalent arrangements would include any textual communication in computer applications, such as word processors, email, web publishing, web TV, PDA, cell phone or Chat sessions. Therefore, persons of ordinary skill in this field are to understand that all such equivalent arrangements are to be included within the spirit and scope of the following claims.

What is claimed is:

1. A method for embedding emotive content into text in a computer application comprising:
   selecting text displayed by the computer application;
   selecting an emotive state from a plurality of emotive states residing in a computer memory associated with said computer application;
   selecting an emotive intensity from a range of emotive intensities residing in a computer memory associated with said computer application;
   mapping to a face glyph representative of the selected emotive state and associated emotive intensity, from a plurality of face glyphs residing in a computer memory associated with computer application; and
   mapping a set of numerical parameters for rendering face glyph mapped from selected emotive state and selected associated emotive intensity,
   whereby a set of representative numerical values map the numerical parameter set to face glyph configuration rendering emotive state and associated intensities to face glyphs in the computer application selected text.

2. A system as in claim 1 further providing a means for selecting and displaying emotive intensity by increasing said size of the face glyph and density of the said face glyph per said selected text region.

3. A system as in claim 1 further providing means for displaying emotive intensity associated with a selected text by region varying features of said selected facial glyph.

4. A system as in claim 1 further comprising:
   means for selecting a color from a plurality of colors residing in a computer memory associated with said computer application; and
   means for associating said selected color with a desired emotive state; and
   means for varying shade of said selected color to be representative of an intensity of the selected emotive state.

5. A system as in claim 1 further comprising means for generating emotive content in the form of face glyphs dynamically, comprising:
   means for mapping selected emotive states and emotive intensities to one or more face glyph facial features which represent an emotive state to be associated with selected text; and
   means for assigning said face glyph features representative of emotive states and intensities to sets of numerical parameters; and
   means for assigning said numerical parameters to one or more facial feature dimensions of the face glyphs; and
   means for applying said numerical parameters for providing facial features in said face glyphs, such that said numerical values can be used to dynamically provide said unique emotive states and intensities in face glyphs.

6. A method for embedding emotive content into text in a computer application comprising:
   selecting text in the computer application;
   selecting an emotive state from a plurality of emotive states stored electronically and associated with the computer application;
   mapping a set of numerical parameters for rendering face glyph colors mapped from selected emotive state;
   mapping a representative color to the selected emotive state; and
   embedding a face glyph mapped from a plurality of face glyphs stored electronically and associated with the computer application, for rendering the face glyph representative of the selected emotive state in mapped color in the selected text of computer application.

7. A method as in claim 6 further comprising rendering selected emotive intensity associated with the emotive state, the shade of the mapped color representative of the selected emotive intensity of mapped color of face glyph rendering the face glyph with the shaded color in the selected text.

8. A method for embedding emotive content into text in a computer application memory buffers comprising:

selecting text of the computer application;

selecting a face glyph, from a set of face glyphs communicatively coupled with said computer application, said face glyph representing an emotive state and emotive intensity, emotive intensity selected from a set of range of intensities, for displaying selected emotive content; and inserting face glyph at display positions not interfering with the readability of selected text;

displaying face glyphs with selected text at readable positions in text display, whereby text and face glyphs are rendered readably superimposed on display.

9. A system as in claim 8 further comprising means for mapping emotive state to color and color intensity onto said face glyphs for display.

10. A system as in claim 8 for mapping emotive states and emotive intensity using mechanisms such as Chernoff Face comprising the manipulation of key facial features such as:

Head Eccentricity;
Eye Eccentricity
Pupil Size;
Eyebrow Slope;
Nose Size;
Mouth Vertical Offset;
Eye Spacing;
Eye Size;
Mouth Width;
Mouth Openness;
Frequency of" blinking eyes, such that the manipulation of said features can generate a glyph representative of a desired emotive state and intensity.

11. A method for decoding textual emotive content from a computer application communication stream, application communicatively coupled with a known collection of feeling words connoting emotion and known collection of qualifying words in association with text in the communication stream, method comprising:

parsing communication stream text for feeling words and qualifying words selected from a plurality of feeling words and qualifying words respectively;

identifying parsed feeling words and words qualifying feeling words, from the collection of feelings words and associated qualifying words stored in memory associated with the computer application;

normalizing the identified feeling words such that each feeling word is weighted numerically from a range, by mapping associated qualifying word to a relative magnitude of emotional intensity within a defined numerical range; and storing said feeling words and associated mapped emotional intensity, in computer memory associated with the computer application, whereby the stored words can be mapped to emotive content of selected text for decoding textual emotive content from a computer application communication stream.

12. A system as in claim 11 enabling construction of translators and parsers which utilize the said decoded emotive context of the selected text as well as the entire communication stream for deriving a translation to a translated text.

13. A method of placing face glyphs, from a set of face glyphs and numerical range of intensities, representing emotive state and associated emotive intensity with associated text, into a communication stream without visual interference, method comprising:

selecting associated text for placement of said glyphs;

performing logical AND operations on addresses in memory device buffers mapped to display devices containing the said text and said face glyphs;

summing values of said AND operation on memory device buffer addresses;

storing said summed values of said AND operations;

comparing said stored values of said AND operations and for choosing a smallest summed value indicative of the least amount of overlap between said glyph and said text;

and embedding the glyphs into associated text at positions giving least overlap between said glyph and said text, whereby glyph and text overlap are minimized, resulting in the least interference for display of face glyph with text.

14. A computer program residing on a computer-readable media, said computer program embedding emotive content into text in a computer application comprising:

selecting text displayed by the computer application;

selecting an emotive state from a plurality of emotive states residing in a computer memory associated with said computer application;

selecting an emotive intensity from a range of emotive intensities residing in a computer memory associated with said computer application; and mapping to a face glyph representative of the selected emotive state and associated emotive intensity, from a plurality of face glyphs residing in a computer memory associated with computer application, whereby emotive state and associated emotive intensity is rendered by the display of representative face glyph with the associated text in the computer application.

* * * * *